United States Patent
Carroll

(10) Patent No.: US 10,723,324 B2
(45) Date of Patent: Jul. 28, 2020

(54) WINDSHIELD WASHER RESERVOIR CONDITIONER

(71) Applicant: WiperFill Holdings LLC, Jupiter, FL (US)

(72) Inventor: Matthew R. Carroll, Jupiter, FL (US)

(73) Assignee: WiperFill Holdings LLC, Jupiter, FL (US)

(*) Notice: Subject to any disclaimer, the term of this patent is extended or adjusted under 35 U.S.C. 154(b) by 32 days.

(21) Appl. No.: 16/226,822

(22) Filed: Dec. 20, 2018

(65) Prior Publication Data

US 2020/0198590 A1 Jun. 25, 2020

(51) Int. Cl.
  *B60S 1/48* (2006.01)
  *C02F 1/68* (2006.01)
  *C02F 1/42* (2006.01)
  *C02F 103/00* (2006.01)

(52) U.S. Cl.
  CPC .................... *B60S 1/48* (2013.01); *C02F 1/42* (2013.01); *C02F 1/688* (2013.01); *C02F 2103/001* (2013.01); *C02F 2201/008* (2013.01); *C02F 2307/00* (2013.01)

(58) Field of Classification Search
  CPC .... B60S 1/48; C02F 1/42; C02F 1/687; C02F 1/688; C02F 1/50; C02F 2103/001; C02F 2201/008; C02F 2307/00
  See application file for complete search history.

(56) References Cited

U.S. PATENT DOCUMENTS

| | | | |
|---|---|---|---|
| 2,701,897 | A | 2/1955 | Leming |
| 2,703,127 | A | 3/1955 | Webb |
| 2,770,017 | A | 11/1956 | Oishei et al. |
| 3,738,575 | A | 6/1973 | Somer |
| 5,261,254 | A | 11/1993 | Cattane |
| 5,347,661 | A | 9/1994 | Fly et al. |
| 5,669,986 | A | 9/1997 | Buchanan, Jr. et al. |
| 6,024,803 | A | 2/2000 | Buchanan, Jr. et al. |
| 6,089,620 | A | 7/2000 | Lopez et al. |
| 6,266,842 | B1 | 7/2001 | Muller |
| 9,000,000 | B2 | 4/2015 | Carroll |
| 9,650,018 | B2 | 5/2017 | Carroll |
| 10,093,283 | B2 | 10/2018 | Carroll |
| 2004/0112411 | A1 | 6/2004 | Boykin et al. |
| 2015/0203075 | A1 | 7/2015 | Carroll |

(Continued)

FOREIGN PATENT DOCUMENTS

| | | |
|---|---|---|
| DE | 4101820 | 7/1992 |
| DE | 4436023 | 4/1995 |
| DE | 20022285 | 7/2001 |

(Continued)

*Primary Examiner* — Lucas A Stelling
(74) *Attorney, Agent, or Firm* — McHale & Slavin, P.A.

(57) ABSTRACT

A system and method of collecting and conditioning rainwater and other moisture, such as dew, from a windshield of a vehicle and utilizing the collected fluid to replenish the fluids in the windshield washer reservoir. A collection funnel is positioned on a vehicle in order to collect rainwater and other moisture. Rainwater and other fluids from the collection funnel are directed to a conditioning cartridge capable of treating the fluid with a surfactant to form a mixed fluid. An anti-freeze material may also be added. The mixed fluid is directed to the pre-existing windshield washer reservoir.

11 Claims, 3 Drawing Sheets

(56) References Cited

U.S. PATENT DOCUMENTS

2016/0332601 A1* 11/2016 Carroll ..................... B60S 1/50

FOREIGN PATENT DOCUMENTS

| DE | 10057980 | 12/2002 |
| DE | 10138466 | 4/2003 |
| DE | 102005055714 | 3/2007 |
| EP | 1053922 | 11/2000 |

* cited by examiner

WINDSHIELD WASHER RESERVOIR CONDITIONER

REFERENCE TO RELATED APPLICATIONS

This application is related to U.S. Pat. No. 9,000,000, issued Apr. 7, 2015, entitled "WINDSHIELD WASHER CONDITIONER".

FIELD OF THE INVENTION

The present invention relates generally to an apparatus and method of replenishing and conditioning the fluid within a windshield washing system. In particular, to an improved apparatus which can recover rainwater, dew and recapture dispensed fluids from the windshield of a vehicle to replenish and condition the fluid within a windshield washing system.

BACKGROUND OF THE INVENTION

Windshield cleaning systems are old and well known in the art. Most of them employ a reservoir containing a fluid, such as water. The water can include an additive which will prevent the water from freezing in the colder climates. This additive is commonly known as a deicer. The deicer can also remove ice that has formed on the windshield of a vehicle. Other additives to the fluid reservoir include substances which enhance the cleaning properties of the water/fluid in the reservoir, such as all season windshield cleaner, all season windshield cleaner and deicer, rain repellant with or without all season cleaner or all season windshield cleaner and deicer.

In the winter months, when slush and other substances from the roads splash up onto the windshield of vehicles, the operator of the vehicle utilizes the windshield washer system repeatedly to clean the windshield to provide a clear view for driving. This high use of the windshield washer system can and normally does result in all of the fluid in the windshield washer reservoir being used up rapidly. If the vehicle operator is not vigilant in maintaining the washer reservoir full of fluid, the operator may be without the ability to clean the windshield when the need arises. Thus there is a need to provide a system and method of readily replenishing the fluid in a windshield washer reservoir without the vehicle operator constantly monitoring the fluid in the windshield washer reservoir.

DESCRIPTION OF THE PRIOR ART

U.S. Pat. No. 2,701,897 discloses a windshield cleaning system using water from the cooling system of an automobile. A metered amount of detergent is placed into the dispersed fluid.

U.S. Pat. No. 2,770,017 discloses a method of automatically replenishing the supply of liquefied solvent to the reservoir of a windshield washer. A trough or pipe line leads from the ventilating duct in the cowl as a means for recovering rainwater.

U.S. Pat. No. 3,738,575 discloses an automatic windshield washer for a vehicle of the type having a reservoir and spray nozzles. Means are provided to collect rain water and car wash water from the outer surface of the vehicle and means to feed the collected water to the reservoir. The valve means can trap sediment and add cleaning agents to the collected water.

U.S. Pat. No. 5,261,254 discloses a method and apparatus for self-replenishment of the solution contained within an automobile windshield washer system. Water is extracted from air such as through the use of a desiccant system in combination with an automobile air conditioning system. This water is combined with a stored concentrated anti-freeze liquid in a preselected ratio to produce a windshield washer solution having sufficient freezing point depression for use during winter weather conditions.

U.S. Pat. Nos. 5,669,986 and 6,024,803 disclose the use of rainwater on a vehicle to clean collection surfaces which have been contaminated with agents such as road salt and for storage in a reservoir for later use in windshield washing.

U.S. Pat. No. 6,266,842 discloses a windshield cleaning device for a windshield of a motor vehicle. A collecting device is provided for collecting and returning excess sprayed cleaning liquid, spray water, and rain water into the windshield fluid reservoir. A heat exchanger is provided for heating the cleaning liquid pumped by the pump by heat energy derived from the cooling water cooling the motor of the motor vehicle. A control circuit measures at least one temperature that can be the ambient temperature or the temperature of the cleaning liquid and allows pumping of the cleaning liquid onto the windshield only above a set temperature limit. A metering device automatically introduces an alcohol mixture, and optionally surface-active agents, into the cleaning liquid based on the measured temperature.

U.S. Pat. Nos. 9,000,000; 9,650,018 and 10,093,283 which are incorporated by reference are directed to a vehicular windshield washer fluid replenishing system for conditioning and treating rainwater for use in a preexisting windshield washer reservoir comprising ion exchange resin chamber and a mixing chamber fluidly coupled to the ion exchange chamber which adds a fluid concentrate to the conditioned rain water. The fluid concentrate contains a fluid concentrate with a wick extending from the concentrate chamber to the mixing chamber for providing a capillary draw of fluid concentrate from the concentrate chamber to the mixing chamber.

SUMMARY OF THE INVENTION

A system and method of collecting rainwater and other moisture, such as dew, from a windshield of a vehicle and conditioning the collected fluid to replenish the windshield washer reservoir. One or more collection funnels are located at various locations on a vehicle. Rainwater and other fluids from these funnels are directed to a fluid conditioning cartridge. The fluid conditioning cartridge is formed from an open cell polyurethane structure containing a surfactant. Optionally an anti-freeze material may be placed in the open cell structure. Fluids collected are passed through the cartridge where the fluid is exposed to surfactant and optionally an anti-freeze before delivery to the windshield washer reservoir.

It is an objective of the present invention to collect rain water, dew, or melting snow fluids from a vehicle windshield and condition the fluids to assist in maintaining a windshield washer reservoir in the vehicle.

It is another objective of the present invention to disclose a system that treats collected fluids and forwards the treated fluids to a vehicle windshield washer reservoir eliminating the need for purchasing liquid windshield washer fluid.

It is yet another objective of the present invention to provide treated rain water having low dissolved minerals to a vehicle windshield washer reservoir.

It is a still further objective of the present invention to provide a replaceable fluid conditioning cartridge to treat the fluids being directed to a windshield washer reservoir, wherein the replaceable fluid conditioning cartridge can be stored indefinitely.

It is yet still another objective of the present invention to provide a mixing cartridge formed from open cell polyurethane structure having soap or the like surfactant impregnated into the cartridge. Fluid passing through the cartridge slowly removing the surfactant to replenish the fluids in a windshield washer with a treated fluid.

Another objective of the present invention is to impregnate an open cell polyurethane structure with an anti-freeze power material such as hydrogen borate or the like.

Another objective of the present invention is to provide an alternative to conventional windshield washer fluids wherein replacement cartridges allows for ease of shipping through the mails, eliminates the need for carrying spare fluids in the trunk of a vehicle, and eliminates the need for funnels used in filling of a reservoir.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
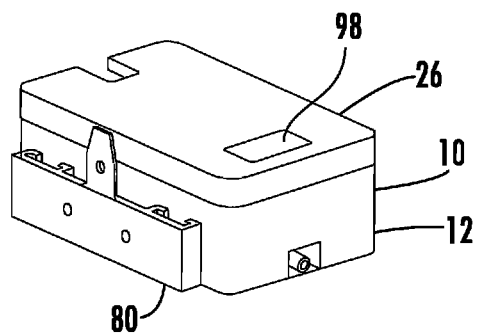
FIG. 1 is a perspective view of the present invention.
Figure 2:
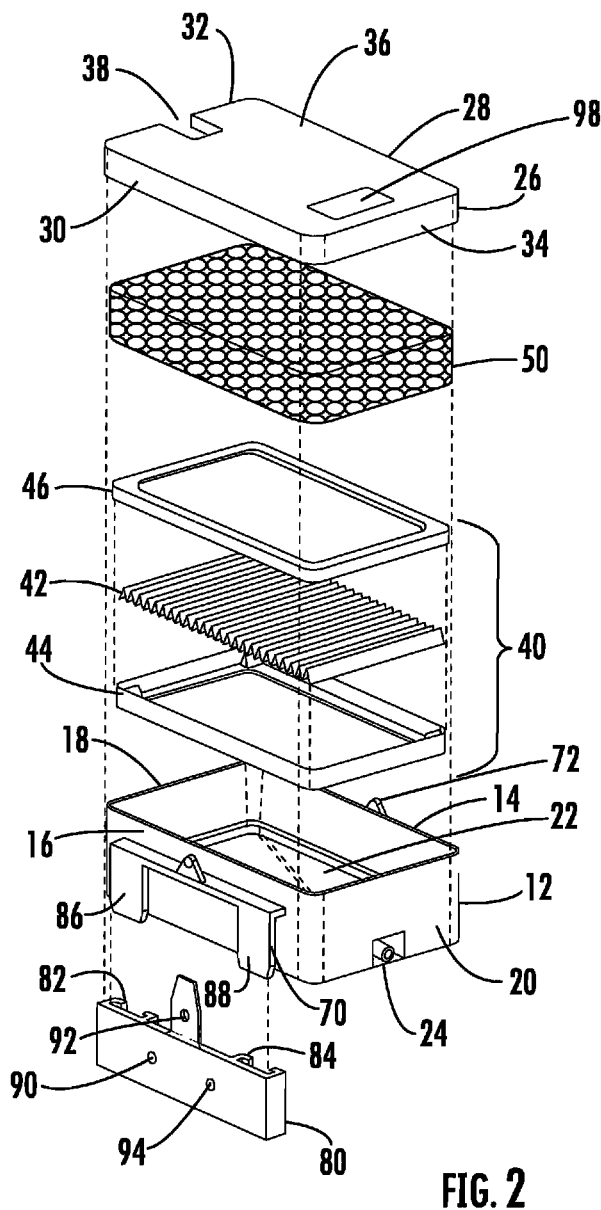
FIG. 2 is an exploded view thereof.
Figure 3:
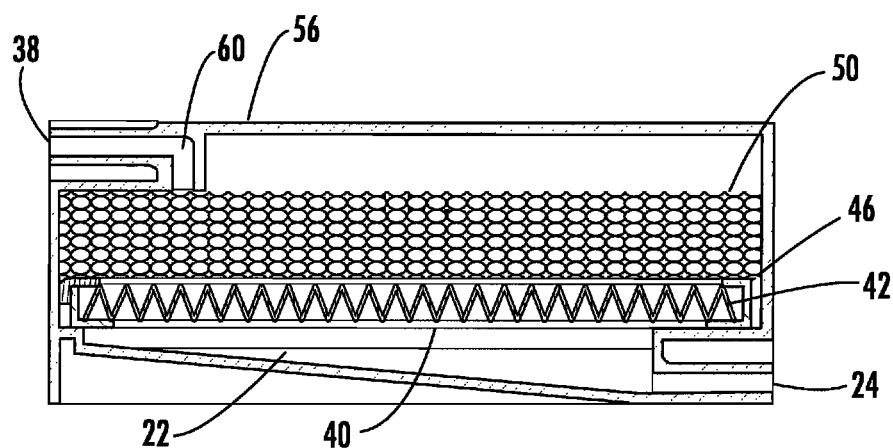
FIG. 3 is cross sectional side view thereof.
Figure 4:
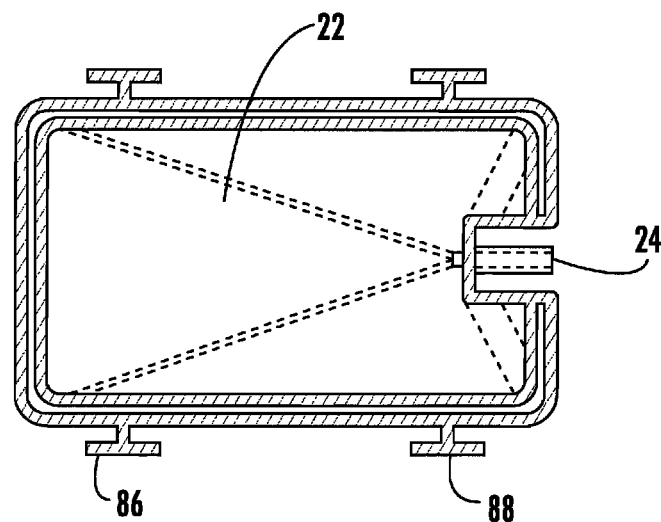
FIG. 4 is a top view thereof.
Figure 5:
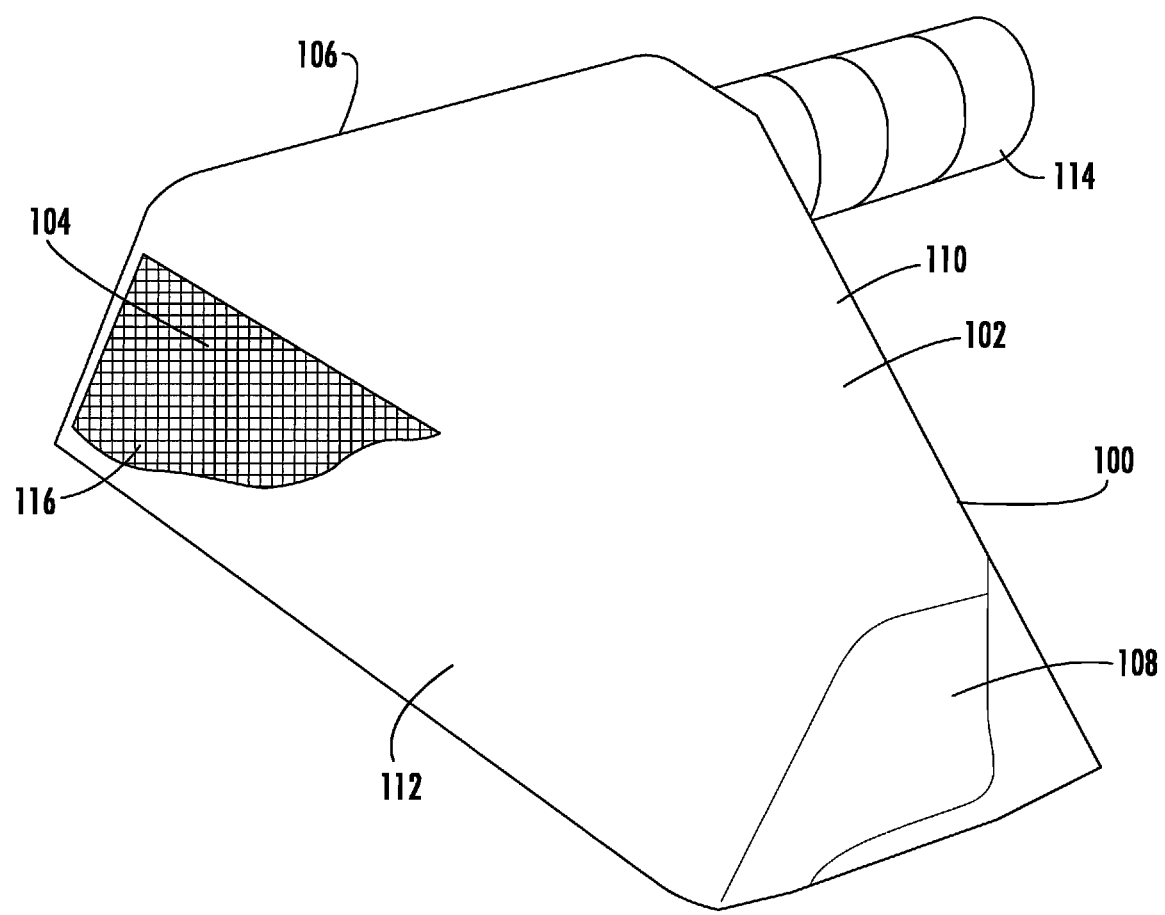
FIG. 5 is a perspective view of a collection funnel.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to the figures in general, set forth is a vehicular windshield washer fluid replenishing system. The system allows for the conditioning and treating of water that impacts the windshield of a vehicle to supplement a pre-existing windshield washer reservoir. The system consists of a housing 10 having a base 12 and a lid 26. The base 12 consists of side walls 14 and 16, end walls 18 and 20, and a sloped bottom wall 22. The sloped bottom wall works as a directional ramp to expel fluid from the base through outlet 24 located along end wall 20. The housing 10 includes a removable lid 26 formed from side edges 28 and 30, and end edges 32 and 34 and top wall 36. An inlet 38 is located along end edge 32. The base 12 and lid 26 form an enclosure for containing a filter assembly 40 and a conditioning cartridge 50.

A filter assembly 40 may be employed using an element capable of filtering particulates greater than 30 microns from fluid. The filter assembly allows the use of a conditioning cartridge that degrades or dissolves during use. The filter 42 has a length and a width as to approximate the length and the width of interior of the base 12. The filter element 42 is supported by a lower frame 44 and an upper frame 46 wherein the filter element 42 material can be replaced. The filter assembly 40 is releasably secured within the base 12 to allow for ease of installation and removal. The filter element is sized and constructed to provide a low flow rate for optimal longevity. In the preferred embodiment the filter element 42 is pleated to increase the available surface area for treating fluid.

The conditioning cartridge 50 is securable within the base 12 and positioned over the filter assembly 40. The conditioning cartridge 50 is formed from an open cell polyurethane containing a dried surfactant. In the preferred embodiment the open cell polyurethane operates as a holding sponge and filter. The open cell structure is a sponge containing the surfactant wherein the sponge is constructed and arranged to filter fluid. In an alternative embodiment the conditioning cartridge is made of a dissolving material wherein a filter is used in combination to prevent passage of particulates. In preparation of the conditioning cartridge placement, the open cell polyurethane structure is first saturated with a liquid surfactant solution. The structure is dried by evaporation of liquid leaving the surfactant adhering to the cell structure. Once dry the cell structure which forms the cartridge essentially bleeds the surfactant into fluid that passes through the cartridge forming a windshield washer fluid. Rainwater, dew and/or snow collected on a windshield are low in mineral deposits and works as the fluid which, together with the surfactant minimizes mineral deposits on the windshield.

The surfactant lowers the surface tension of the fluid to help in cleaning of the windshield by removal of window contaminants. The surfactant helps in dislodging matter from a windshield and retains the matter in suspension thereby cleaning the windshield of matter that can disrupt the optical clarity of the windshield.

In addition, a powder capable of lowering the freezing temperature of water can also be impregnated into the conditioning cartridge. For instance, a solution of hydrogen borate or boric acid may be added to the cartridge by first hydrating the solution and cell structure followed by drying the cartridge to remove the moisture. In a similar manner as the addition of the surfactant to the cell structure, fluid passing through the cartridge draws the anti-freeze material from the cell structure forming a mixed solution having sufficient anti-freeze material to lower the freezing temperature of fluid within the windshield washer reservoir. The conditioning cartridge can be easily replaced upon exhaustion. Unique to this invention is that the conditioning cartridge can be stored indefinitely.

In operation, fluid collected from the windshield of a vehicle is directed through the inlet 38 into portal 60 which is at a position so as to direct water flow to distribute over the cartridge 50. The surfactant, and optionally the anti-freeze concentrate, is of a formulation that will bleed slowly providing longevity. A line loop, not shown, can be placed in the installation so as to direct fluid away from the housing 10 if the windshield washer reservoir, not shown, is full. The line loop operates as a bypass when the washer reservoir is full thereby extending the life of the conditioning cartridge.

The treated fluid that passes through the open cell polyurethane and past the filter assembly 40 to remove particulates. In the preferred embodiment the use of a 30 micron filter provides the longest longevity while capable of filtering sufficiently to remove particles capable of clogging spray jets used in most all vehicles. The treated and filtered fluid passes through the filter assembly 40 and collects on the bottom wall 22 of the base 10. The bottom wall 22 is sloped so as to direct the treated fluid toward outlet 24.

The base 12 includes a first bracket 70 formed along side wall 16, with a second bracket 72 forming a reciprocal of bracket 70 position along wall 14. Brackets 70 and 72 allow for ease of engagement with a mounting bracket 80 for securement within the engine compartment of a vehicle. The mounting bracket 80 includes receptacles 82 and 84 for receipt of tangs 86 and 88 of bracket 70. The mounting bracket 80 includes apertures 90, 92 and 94 available for receipt of a fastener, such as a screw, so as to secure the housing to the vehicle.

The lid 26 includes a clear sight viewing port 98, located along the top wall 36, so as to allow inspection of the conditioning cartridge 50, for determining concentrate levels. In the preferred embodiment, the conditioning cartridge 50 is made of a transparent or translucent material, allowing ease of inspection of the concentrate fluid. The additive to the conditioning cartridge 50 changes the color of the polyurethane. For instance, the polyurethane can be a clear color free material. A surfactant added to the polyurethane is colored which effectively hides the clear polyurethane. By way of example, a surfactant colored green would conceal the clear polyurethane and, as the surfactant is bled away, the clear polyurethane can be viewed through the view port 98. It should be noted that clear polyurethane is only an example, the polyurethane may be of any color and is frequently milky white. Further, polyurethane is but one example of an open cell material, random-celled hydrophilic urethane or the like may also be employed.

Water collected for introduction into the inlet aperture is performed by a collection funnel 100 having an angular shaped upper wall 102 and lower wall 104 spaced apart by opposing side walls 106 and 108 and back wall 110. A front wall 112 is sloped wherein water entering the funnel is directed by the walls shapes to an outlet 114. The outlet 114 is coupled to the inlet 38 of the lid 26 by a flexible tube, not shown. A stainless steel screen 116 is placed over the entry of the funnel 100 to prevent larger matter from clogging the outlet 114. The collection funnel 100 is constructed and arranged for positioning between a windshield and hood of a vehicle for the collection of water.

In a preferred embodiment the collection funnel 100 is positioned on the driver's side of the vehicle but could be positioned in another suitable location. One edge of the mouth will be contoured to fit the arc of the windshield and ensure a water tight seal. This edge will most likely be made of a soft rubber or any suitable material for creating a water tight seal. The positioning of the collection funnel 100 provides gravity feeding of collected liquid to the housing 10. In addition to gravity flow, pumps and other types of fluid transport mechanisms can be utilized to transport the fluids from the collection funnel 100 to the housing 10.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A vehicular windshield washer fluid replenishing system for a vehicle windshield washer reservoir comprising:
   a collection funnel for receipt of water that drains from the windshield for directional passage of the water;
   a housing coupled to a collection funnel outlet, said housing defined by a bottom wall having a first and second side wall extending upward with first and second end walls therebetween, with a removable top forming a chamber therein;
   an inlet formed in said removable top having an inlet coupling said collection funnel outlet to said chamber;
   a conditioning cartridge formed of open cell structure containing a surfactant, said cartridge constructed and arranged for replaceable positioning within said chamber;
   an outlet formed in said bottom wall and fluidly coupled to a vehicle windshield water reservoir;
   wherein fluid from said collection funnel is passed through said housing whereby the fluid mixed with said surfactant and directed to said vehicle washer reservoir.

2. The vehicular windshield washer fluid replenishing system according to claim 1 wherein said open cell structure is polyurethane.

3. The vehicular windshield washer fluid replenishing system according to claim 1 wherein said open cell structure is a sponge containing said surfactant and said sponge is constructed and arranged to filter said fluid.

4. The vehicular windshield washer fluid replenishing system according to claim 1 wherein said surfactant is dry being integrated into open cells of said conditioning cartridge.

5. The vehicular windshield washer fluid replenishing system according to claim 1 including a dry anti-freeze compound being integrated into open cells of said conditioning cartridge, wherein said antifreeze is used to lower the fluid freezing temperature.

6. The vehicular windshield washer fluid replenishing system according to claim 1 including a filter positioned between said conditioning cartridge and said bottom wall of said housing.

7. The vehicular windshield washer fluid replenishing system according to claim 6 wherein said filter is capable of filtering particulates greater than 30 microns from the fluid.

8. The vehicular windshield washer fluid replenishing system according to claim 6 wherein said filter is pleated.

9. The vehicular windshield washer fluid replenishing system according to claim 1 including a viewing port in said removable top allows visual inspection of said conditioning cartridge to determine surfactant presence.

10. The vehicular windshield washer fluid replenishing system according to claim 1 wherein said collection funnel further including a screen to filter out large particles.

11. The vehicular windshield washer fluid replenishing system according claim 1 wherein said open cell structure is formed of a first color and said surfactant is a second color, whereby said open cell structure returns to said first color when said surfactant is expended.

* * * * *